(12) United States Patent
Vanthoor

(10) Patent No.: US 7,320,277 B2
(45) Date of Patent: Jan. 22, 2008

(54) COOKING UTENSIL

(75) Inventor: Rafael Vanthoor, Heusden-Zolder (BE)

(73) Assignee: Berghoff Worldwide, Heusden-Zolder (BE)

( * ) Notice: Subject to any disclaimer, the term of this patent is extended or adjusted under 35 U.S.C. 154(b) by 596 days.

(21) Appl. No.: 10/495,079

(22) PCT Filed: Nov. 9, 2001

(86) PCT No.: PCT/BE01/00194

§ 371 (c)(1),
(2), (4) Date: Jul. 13, 2004

(87) PCT Pub. No.: WO03/043473

PCT Pub. Date: May 30, 2003

(65) Prior Publication Data

US 2006/0054027 A1    Mar. 16, 2006

(51) Int. Cl.
*A47J 36/02* (2006.01)
(52) U.S. Cl. .................. 99/422; 99/447; 126/390.1; 220/611; 220/626; 220/573.1; 220/912
(58) Field of Classification Search .................. 99/422, 99/447, 401; 126/390, 390.1; 220/912, 220/626, 636, 611, DIG. 12, 573.1
See application file for complete search history.

(56) References Cited

U.S. PATENT DOCUMENTS

| | | | |
|---|---|---|---|
| 3,045,664 A | | 7/1962 | Levin |
| 4,350,259 A | | 9/1982 | Cartossi |
| 4,596,236 A | * | 6/1986 | Eide .......................... 219/621 |
| 5,487,329 A | * | 1/1996 | Fissler ........................ 99/403 |
| 5,497,696 A | * | 3/1996 | Coudurier et al. ............ 99/422 |
| 5,532,461 A | * | 7/1996 | Crummenauer et al. .... 219/621 |
| 5,647,271 A | | 7/1997 | Capelle et al. |
| 5,711,290 A | * | 1/1998 | Kim ........................ 126/390.1 |

* cited by examiner

Primary Examiner—Reginald L. Alexander
(74) Attorney, Agent, or Firm—Dykema Gossett PLLC

(57) ABSTRACT

Cooking utensil suitable for heating on both thermal and induction heat sources, comprising a container having a container bottom to which a base is connected, the base comprising a peripheral wall and a bottom side and having a layered structure. An inner region of the bottom side of the base is at least partly constructed in a material of higher thermal conductivity than the material of an outer region of the bottom side of the base. The layered structure is constructed such that the average thermal conductivity of the layered structure between the inner region of the bottom side of the base and a peripheral region of the container bottom is higher than the average thermal conductivity of the layered structure between the inner region of the bottom side of the base and a central region of the container bottom.

9 Claims, 3 Drawing Sheets

COOKING UTENSIL

The present invention relates to a cooking utensil according to the preamble of the first claim.

A cooking utensil is for example known from U.S. Pat. No. 4,350,259. The cooking utensil known from U.S. Pat. No. 4,350,259 is suitable for heating on both thermal and induction heat sources. The cooking utensil comprises a container to the bottom of which a base is connected. This base has a layered structure comprising an upper conductive layer connected to the bottom of the container, an inductive layer connected to the upper conductive layer, a lower conductive layer connected to the inductive layer and a protective layer connected to the lower conductive layer. The conductive layers make the cooking utensil suitable for use on thermal heat sources and the inductive layer makes it suitable for use on induction heat sources.

In a first embodiment described in U.S. Pat. No. 4,350,259, the inductive layer of the base of the cooking utensil, which is interposed between the upper and lower conductive layers, is provided with openings. The purpose of these openings is to allow the material of the upper and lower conductive layers to fill these openings during construction of the cooking utensil, so that the upper and lower conductive layers contact each other and that the mechanical anchoring of the inductive layer in between the conductive layers can be improved.

In a second embodiment described in U.S. Pat. No. 4,350,259, the protective layer of the base of the cooking utensil, which is applied on the lower conductive layer, is provided with openings. These openings are provided in order to allow the material of the lower conductive layer to fill these openings during construction of the cooking utensil, so that the protective layer is anchored in the lower conductive layer.

The cooking utensil known from U.S. Pat. No. 4,350,259 however has the disadvantage that, upon heating the cooking utensil on a thermal heat source, such as for example a gas oven or a ceramic hob, the bottom of the container is heated unevenly. More particularly, the bottom of the container is heated more quickly in the centre than at its periphery. As a result, the temperature of the centre of the bottom of the container may become too high, so that food being prepared in the container may be burnt at the centre.

It is an aim of the present invention to provide a cooking utensil of which the base enables a more even heating of the bottom of the container.

This aim is achieved according to the invention with a cooking utensil showing the technical characteristics of the characterising part of the first claim.

In the cooking utensil of the invention, the bottom side of the base, which is provided to contact the heat source, comprises an inner region and an outer region. The inner region is at least partly constructed in a material of higher thermal conductivity than the material of the outer region. As a result, when the cooking utensil is used on a thermal heat source, heat is absorbed by the base faster at the inner region than at the outer region of the bottom side of the base. The layered structure of the base is further constructed such that its average thermal conductivity is higher between the inner region of the bottom side and the peripheral region of the container bottom than between the inner region of the bottom side and the central region of the container bottom. As a result, when the cooking utensil is used on a thermal heat source, heat is conducted faster from the inner region of the bottom side to the peripheral region of the container bottom than to the central region of the container bottom.

An analysis of the problem of uneven heating has shown that it is mainly caused by the fact that in most commonly used thermal heat sources, such as for example a ceramic hob, more heat is generated more towards the centre than towards the periphery of the heat source. In other words, there is a heat excess in the centre with respect to the periphery of the heat source. By providing the higher thermal conductivity of the layered structure towards the periphery than towards the centre of the container bottom, this central heat excess may be distributed by the base over the whole of the container bottom in a faster manner. As a result, a more uniform heating of the container bottom can be achieved and burning of food at the centre of the container bottom can be prevented.

Furthermore, by providing the bottom side of the base with an inner region at least partly in a material of higher thermal conductivity, the central excess of heat is partly removed from the heat source, so that the difference in temperature between the centre and the periphery of the heat source can be decreased. As a result, the heat source can have a more uniformly distributed temperature, so that the overall uniformity of heating of the container bottom can be further enhanced.

The higher thermal conductivity in the inner region on the bottom side also has the effect that the base of the cooking utensil of the invention absorbs heat faster in the region of the heat source where the most heat is generated. As a result, the amount of time needed for heating the container bottom can be reduced, so that the preparation of food with the cooking utensil of the invention can sooner be started with.

In a preferred embodiment of the cooking utensil of the invention, the layered structure of the base comprises an upper conductive layer connected to the container bottom, an inductive layer connected to the upper conductive layer, a lower conductive layer connected to the inductive layer and a protective layer connected to the lower conductive layer. The upper and lower conductive layers have a higher thermal conductivity than the inductive layer and the protective layer. The inductive layer has good induction properties and is as such provided for enabling heating on induction heat sources. The conductive layers have good thermal conduction properties for distributing the heat generated by thermal heat sources or in the inductive layer in case of use on an induction heat source.

In this preferred embodiment, at least the outer region of the bottom side of the base is formed by the protective layer. This means that the protective layer forms the whole of the outer region of the bottom side, but that it may also comprise a portion within the inner region of the bottom side of the base. According to the invention, the inner region is at least partly in a material which has a higher thermal conductivity than the material of the outer region. So the fact that in this embodiment the whole of the outer region is formed by the protective layer means that the inner region of the bottom side is at least partly of a material with a thermal conductivity above that of the protective layer. This material can be that of the lower conductive layer or of an additional layer, as will become apparent from further embodiments of the cooking utensil of the invention described below.

Further, in this preferred embodiment, the thermal conductivity of the layered structure of the base at the level of the inductive layer is higher at the peripheral wall than inwardly from the peripheral wall. This is a way of constructing the layered structure such that the average thermal conductivity of the layered structure is higher towards the peripheral region than towards the central region of the container bottom.

Constructing the layered structure such that the thermal conductivity at the level of the inductive layer is higher at the peripheral wall can be achieved in many ways. Preferably, this construction is achieved in that the upper and lower conductive layers of the base contact each other at the peripheral wall of the base and that the inductive layer separates the upper and lower conductive layers inwardly from the peripheral wall. This means that the upper and lower conductive layers contact each other only at the peripheral wall and not inwardly from the peripheral wall. As the inductive layer has a lower thermal conductivity than the conductive layers, the thermal conductivity of the layered structure is higher at the peripheral wall by the contact between the conductive layers.

The higher conductivity at the peripheral wall can however also be achieved in other ways, for example by providing cut-outs in the inductive layer at the peripheral wall in which the material of the conductive layers is allowed to penetrate during construction of the cooking utensil, or by reducing the thickness of the inductive layer at the peripheral wall. In the first embodiment of the prior art cooking utensil described above, the inductive layer is provided with openings which are filled by the material of the conductive layers during construction. These openings are provided in order to improve the mechanical anchoring of the inductive layer between the conductive layers. The openings are however distributed over the whole of the inductive layer and it is not specified that these openings create a variation in the thermal conductivity of the layered structure. As a result, there is no teaching in U.S. Pat. No. 4,350,259 of how to provide the layered structure with a higher thermal conductivity at the peripheral wall of the base, nor that this can be used to achieve a more uniform heating of the container bottom.

In a further preferred embodiment of the cooking utensil of the invention, the protective layer forms part of the inner region, one or more cut-outs being provided in the protective layer in the inner region. This means that, where the cut-outs are provided, the material of the inner region is that of the lower conductive layer. Additionally, a layer of highly conductive material may be applied in any of the cut-outs, so that, the material of the inner region at the cut-outs is that of this additional layer. The highly conductive material has a thermal conductivity equal to or above that of the lower conductive layer. In either case, whether or not the additional layer is applied in the cut-outs, it is achieved that the material in the inner region at the cut-outs has a higher thermal conductivity than the material of the outer region of the bottom side of the base. In the second embodiment of the prior art cooking utensil described above, the protective layer of the base of the cooking utensil is provided with openings which are filled by the material of the lower conductive layer during construction of the cooking utensil. These openings are provided in order to mechanically anchor the protective layer in the lower inductive layer. The openings are however distributed over the whole of the protective layer and it is not specified that these openings create a variation in the thermal conductivity of the bottom side of the base. As a result, there is no teaching in U.S. Pat. No. 4,350,259 of how to provide the bottom side of the base with an inner region at least partly of higher conductivity than an outer region, nor that this can be used to achieve a more uniform heating of the container bottom.

The one or more cut-outs can have various shapes. In one preferred embodiment of the cooking utensil of the invention, the protective layer is provided with a cut-out which is located centrally on the bottom side of the base and has a diameter of about one third of the diameter of the base. Preferably, a layer of highly conductive material is applied in this central cut-out. The highly conductive material has a thermal conductivity which is equal to or above the thermal conductivity of the lower conductive layer. This layer of highly conductive material forms a thermal bridge between the thermal heat source and the lower conductive layer, so that the speed of heat absorption of the inner region of the base can be further increased.

In other preferred embodiments of the cooking utensil of the invention, the cut-outs take the shape of one or more rings or illustrations. These ring-shaped and illustration-shaped cut-outs may be combined with each other as well as with the central cut-out described above. These cut-outs may also be provided with a layer of highly conductive material. The highly conductive material is preferably copper or a copper alloy, but may also be any other material with high thermal conductivity known to the person skilled in the art.

The protective layer of the base preferably comprises a peripheral portion which forms substantially half of the peripheral wall of the base. In this way, half of the peripheral wall of the base is protected against corrosion, while the other half is left uncovered, so that a sideways thermal expansion of the layers of the base as a result of heating is substantially not obstructed. As a result, the base can be constructed with a substantially flat bottom side, whereas a concavity in the bottom side of the base is required in most prior art cooking utensils of similar type to enable vertical thermal expansion of the base without the bottom side becoming convex. By leaving part of the peripheral wall of the base uncovered, the provision of such concavity is no longer required or at least the amount of concavity can be reduced, as the layers can freely expand sideways. In this way, when the cooking utensil of the invention is for example used on a ceramic hob, substantially the whole of the bottom side of the base is immediately in contact with the ceramic hob, so that the speed of heat absorption of the base and in particular its inner region can be further increased.

The invention will be further elucidated by means of the following description and the appended figures.

Figure 1:
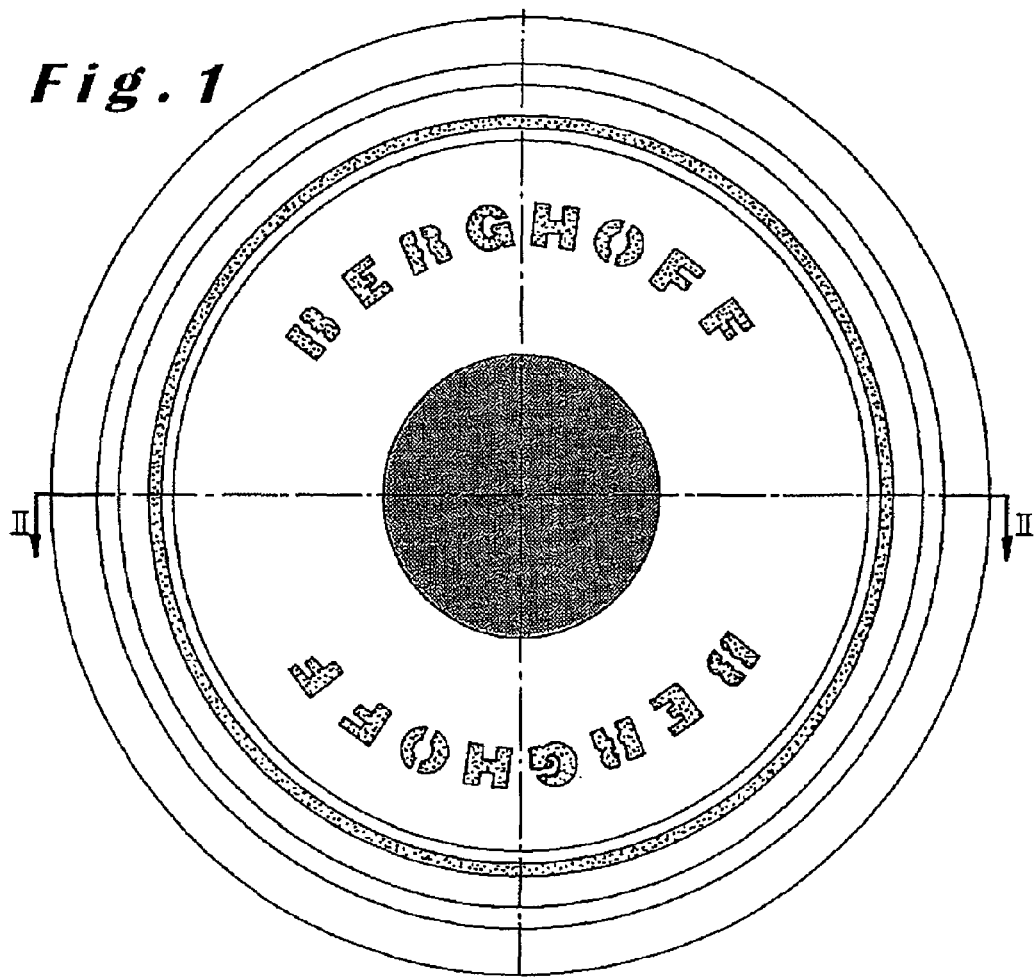
FIG. 1 shows a bottom view of a first preferred embodiment of the cooking utensil according to the invention.
Figure 2:
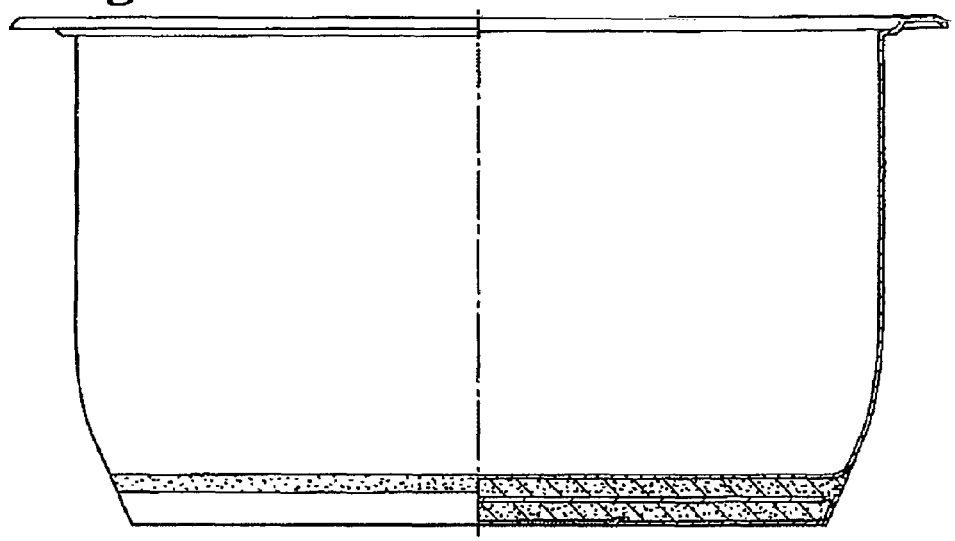
FIG. 2 shows a side and cross-sectional view of the cooking utensil of FIG. 1, the cross section being taken along line II-II of FIG. 1.

The first embodiment of the cooking utensil according to the invention, shown in FIGS. 1 and 2, comprises a container 1 with a bottom 2. A base 3 having a layered structure is connected to the bottom 2 of the container 1. The base 3 comprises a peripheral wall 10 and a bottom side 9, which is located opposite the container bottom 2 and is provided to contact the heat source. The bottom side 9 of the base 3 comprises an outer region 9a, which is delimited by the peripheral wall 10, and an inner region 9b inwardly from the outer region 9a. The container bottom 2 comprises a peripheral region 2a at the peripheral wall 10 and a central region 2b inwardly from the peripheral region 2a.

The inner region 9b of the bottom side 9 of the base 3 is at least partly constructed in a material of higher thermal conductivity than the material of the outer region 9a of the bottom side 9 of the base 3. As a result, when the cooking utensil is used on a thermal heat source, heat is absorbed by the base 3 faster at the inner region 9b than at the outer region 9a of the bottom side 9 of the base 3. Furthermore, a central excess of heat generated in a thermal heat source is partly removed from the heat source, so that the difference in temperature between the centre and the periphery of the heat source can be decreased. As a result, the heat source can have a more uniformly distributed temperature, so that a more uniform heating of the container bottom 2 can be achieved. The higher thermal conductivity in the inner region 9b on the bottom side 9 also has the effect that the base 3 of the cooking utensil of the invention absorbs heat faster in the region of the heat source where the most heat is generated. As a result, the amount of time needed for heating the container bottom 2 can be reduced, so that the preparation of food can sooner be started with.

The layered structure of the base 3 is further constructed such that the average thermal conductivity of the layered structure between the inner region 9b of the bottom side 9 of the base 3 and the peripheral region 2a of the container bottom 2 is higher than the average thermal conductivity of the layered structure between the inner region 9b of the bottom side 9 of the base 3 and the central region 2b of the container bottom 2. As a result, when the cooking utensil is used on a thermal heat source, heat is conducted faster from the inner region 9b of the bottom side 9 to the peripheral region 2a of the container bottom 2 than to the central region 2b of the container bottom 2. As a result, a central heat excess generated by a thermal heat source may be distributed by the base 3 over the whole of the container bottom 2 in a faster manner. This can lead to a more uniform heating of the container bottom 2, so that burning of food at the centre of the container bottom 2 can be prevented.

The layered structure of the base 3 comprises, as shown from top to bottom in the cross section of FIG. 2: an upper conductive layer 4, an inductive layer 5, a lower conductive layer 6 and a protective layer 7. The protective layer 7 forms at least the outer region 9a. The protective layer 7 may also form the outer region 9a only, but as shown it is preferred that the protective layer 7 also forms part of the inner region 9b of the bottom side 9. This is preferred as where the protective layer 7 is applied, the material of the base 3 is protected against corrosion. Furthermore, the protective layer 7 improves the appearance of the cooking utensil towards the user.

The upper and lower conductive layers 4, 6 have good thermal conduction properties for distributing the heat generated by thermal heat sources or in the inductive layer 5 in case of use on an induction heat source. The upper and lower conductive layers 4, 6 are constructed in a material having a higher thermal conductivity than the inductive layer 5 and the protective layer 7. The inductive layer 5 is constructed in a material having good inductivity properties, so that the cooking utensil is suitable for use on induction heat sources.

The upper and lower conductive layers 4, 6 are preferably constructed in aluminium, an aluminium alloy, copper or a copper alloy. The upper and lower layers 4, 6 may however also be constructed in any other material of good thermal conductivity known to the person skilled in the art. The inductive layer 5 is for example constructed in the known "430" steel alloy, or any other material of good inductivity properties. The protective layer 7 is constructed in a substantially corrosion-free material, such as for example the known "430" steel alloy, or any other.

The upper and lower conductive layers 4, 6 preferably have substantially the same thickness, but they may also have a different thickness. The inductive layer 5 preferably has a thickness of about one third of the thickness of the conductive layers 4, 6. The protective layer is preferably as thin as mechanically possible. Suitable thicknesses are about 3 mm for the upper and lower conductive layers 4, 6, about 1 mm for the inductive layer 5 and about 0.5 mm for the protective layer 7.

The cooking utensil of the invention preferably has a circular shape, but may also have an oval, square or any other shape.

The base 3 of the cooking utensil is preferably connected to the bottom 2 of the container by subsequently placing the different layers 4-7 on the bottom 2, heating the layers 4-7 and applying a high pressure on the layers 4-7. In this way, a layered structure with strong intermetallic bonding is achieved.

The thermal conductivity of the layered structure of the base 3 at the level of the inductive layer 5 is higher at the peripheral wall 10 than inwardly from the peripheral wall 10. In the three embodiments of the cooking utensil of the invention, shown in FIGS. 1-6, this is achieved in that the upper and lower conductive layers 4, 6 contact each other at the peripheral wall 10, but only at the peripheral wall 10: inwardly they are separated by the inductive layer 5. By this peripheral contact, it is achieved that heat absorbed by the lower conductive layer 6 is transferred more quickly from the lower conductive layer 6 to the upper conductive layer 4 at the periphery 10 than at the centre of the base 3. The higher conductivity at the peripheral wall 10 can however also be achieved in other ways (not shown), for example by providing cut-outs in the inductive layer 5 at the peripheral wall 10 in which the material of the conductive layers 4, 6 is allowed to penetrate during construction of the cooking utensil, or by reducing the thickness of the inductive layer 5 at the peripheral wall, or in other ways.

The upper and lower conductive layers 4, 6 are preferably constructed in the same material, so as to improve their interconnection at the peripheral wall 10, but may also be constructed in different materials.

According to the invention, the inner region 9b of the bottom side 9 of the base 3 is at least partly constructed in a material of higher thermal conductivity than the material of the outer region 9a of the bottom side 9 of the base 3. In all the embodiments shown, the outer region 9a and part of the inner region 9b is formed by the protective layer 7. In order to achieve that the inner region 9b is at least partly constructed in a material of higher thermal conductivity than that of the protective layer 7, a number of cut-outs 11-13 are provided in the protective layer 7 in the inner region 9b. At these cut-outs 11-13, the material of the bottom side 9 is that of the lower conductive layer 6 or that of an applied additional layer 8 (cf. FIGS. 1 and 2) in a material of high thermal conductivity, above that of the protective layer 7 and preferably equal to or above that of the lower conductive layer 6.

In the first embodiment of FIGS. 1 and 2, a first cut-out 11 is located centrally of the bottom side 9 of the base and has a diameter of about one third of the diameter of the base. A plate 8 in the material of high thermal conductivity is applied in this first cut-out 11. A series of second cut-outs 12 are provided in the protective layer 7 in the inner region 9b, between the central cut-out 11 and the outer region 9a. These second cut-outs 12 have the shape of an illustration. On FIG. 1, it is shown that the material of the lower conductive layer 6 is visible through these second cut-outs 12.

The highly conductive material of the plate 8 is preferably copper or a copper alloy, but may also be any other material of high thermal conductivity known to the person skilled in the art.

Figure 3:
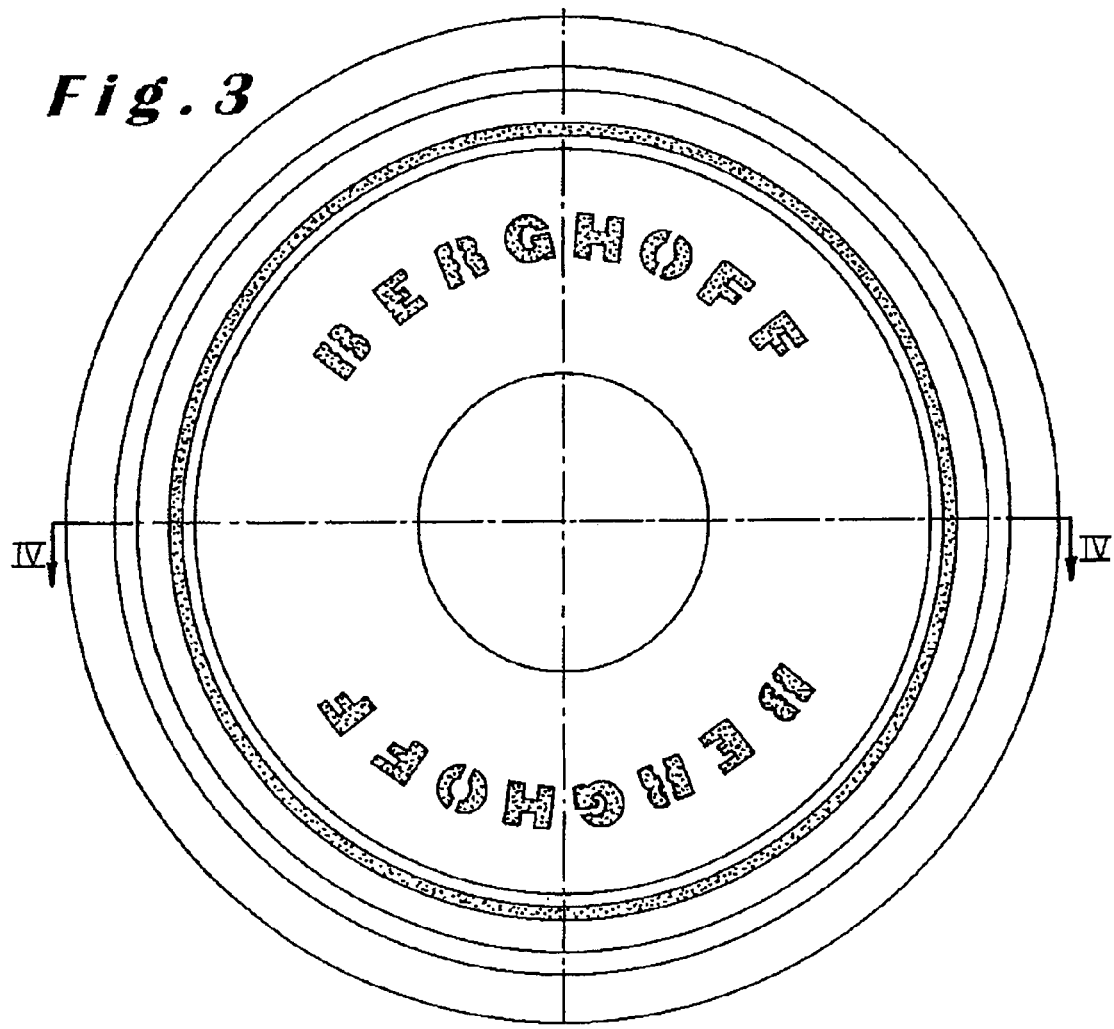
FIG. 3 shows a bottom view of a second preferred embodiment of the cooking utensil according to the invention.
Figure 4:
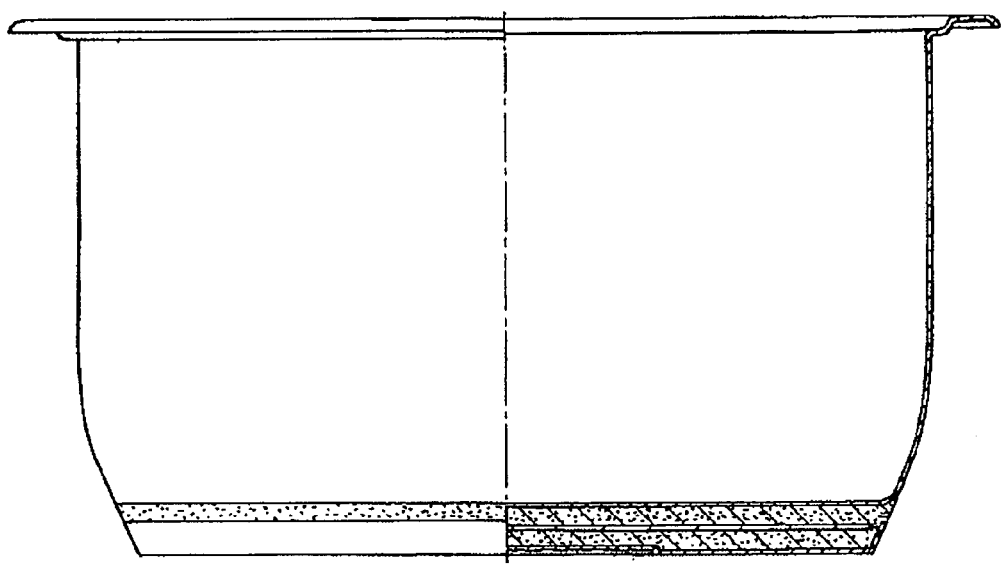
FIG. 4 shows a side and cross-sectional view of the cooking utensil of FIG. 3, the cross section being taken along line IV-IV of FIG. 3.

The second embodiment of the cooking utensil according to the invention, shown in FIGS. 3 and 4, differs from the first embodiment of FIGS. 1 and 2 in that the protective layer 7 does not have a central cut-out 7 with a highly conductive plate 8. Instead, the central portion 15 of the protective layer 7 is formed as a recess in the bottom side 9 of the base 3. This central recess 15 can increase the stability of the cooking utensil when placed on a flat surface, e.g. a hob of a thermal or induction oven.

Figure 5:
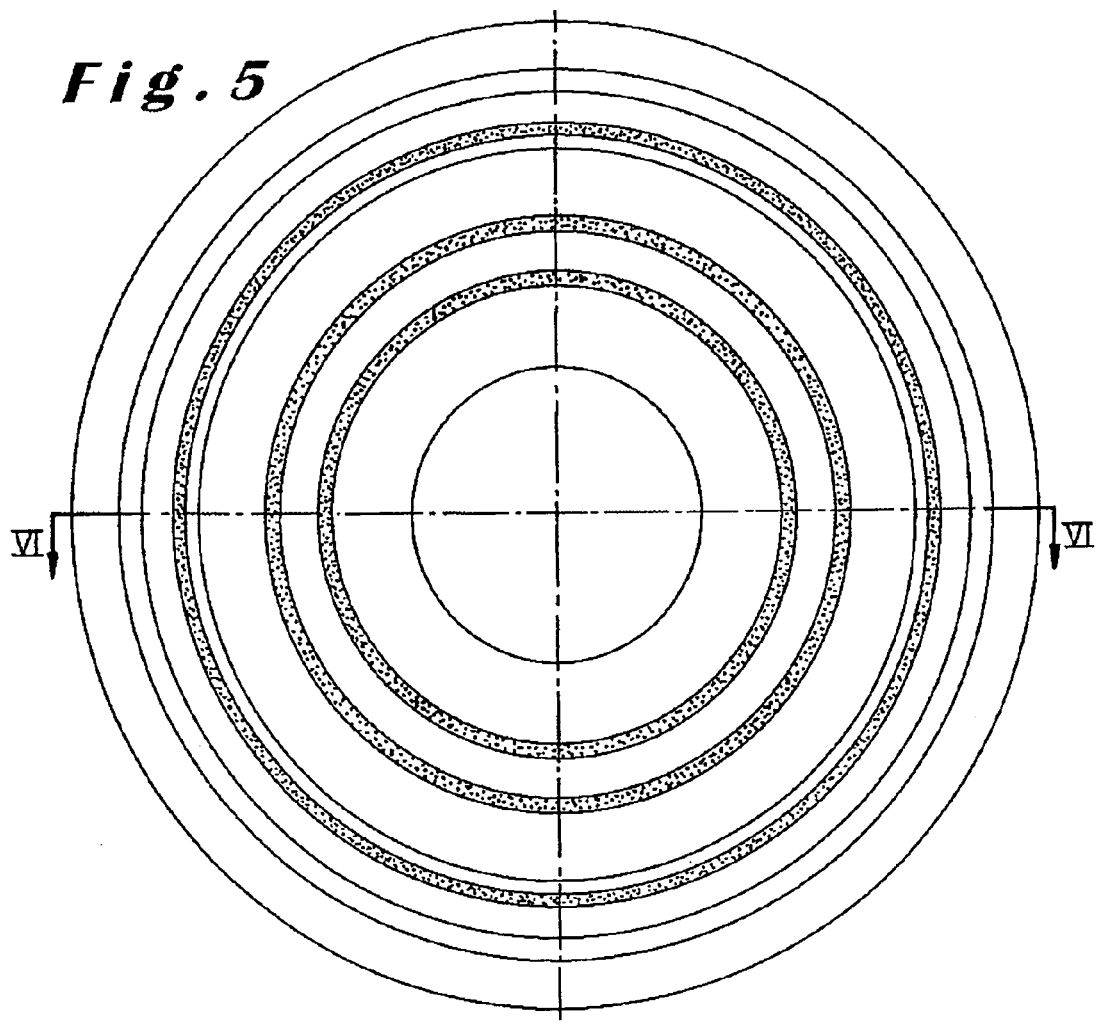
FIG. 5 shows a bottom view of a third preferred embodiment of the cooking utensil according to the invention.
Figure 6:
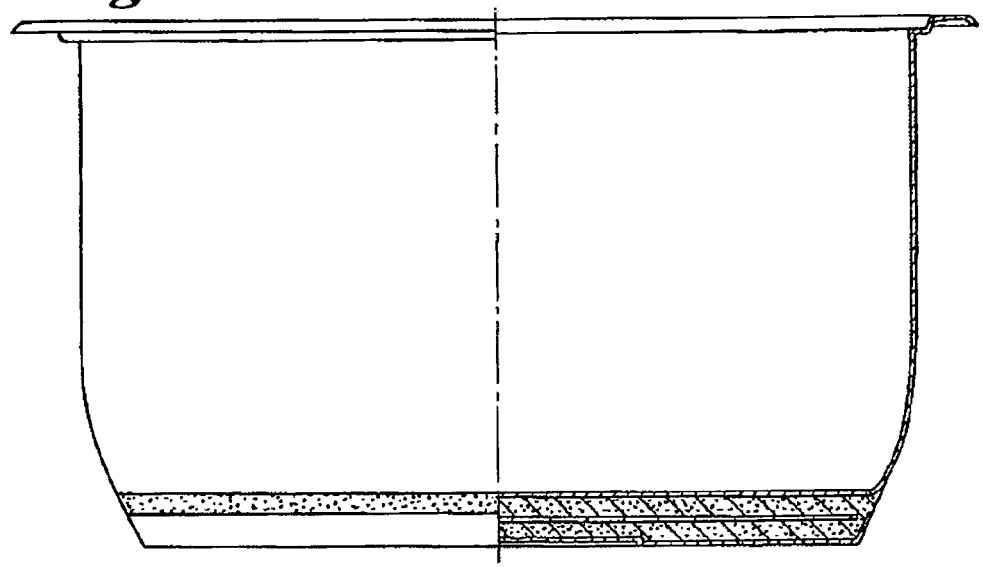
FIG. 6 shows a side and cross-sectional view of the cooking utensil of FIG. 5, the cross section being taken along line VI-VI of FIG. 5.

The third embodiment of the cooking utensil according to the invention, shown in FIGS. 5 and 6, differs from the second embodiment of FIGS. 3 and 4 in that the illustration-shaped second cut-outs 12 are replaced by a pair of third cut-outs 13, which have the form of concentric rings. Again, these ring-shaped cut-outs 13 providing parts of higher thermal conductivity in the inner region 9b of the bottom side 9 of the base.

From the above it is clear that the one or more cut-outs 11-13 in the protective layer 7 can have various shapes. They are preferably achieved by removing part of the protective layer 7 in a milling operation, but may also be achieved in other ways. The layer 8 in a material of high thermal conductivity can be applied in any of the cut-outs 11-13.

As the cut-outs 11-13 provide portions of higher thermal conductivity, heat is more easily absorbed at the cut-outs 11-13 with respect to the portions which are covered by the protective layer 7. As the cut-outs 11-13 are located in the inner region 9b, they are located where the most heat is initially generated in most commonly used thermal heat sources. In this way, the presence of the cut-outs 11, 12 can strongly increase the heat absorption speed of the base 3. By providing the plate 8 in highly conductive material, the heat absorption speed can be further increased, as this plate 8 forms a thermal bridge between the lower conductive layer 6 and the thermal heat source.

As the cut-outs 11-13 are located in the inner region 9b, the distance from the cut-outs 11-13 to the peripheral region 2a of the container bottom 2 is longer than the distance to the central region 2b of the container bottom 2. As a result, it would normally take longer to heat the peripheral region 2a than the central region 2b of the bottom 2 on a thermal heat source. However, because of the peripheral contact between the upper and lower conductive layers 4, 6 and the inward separation between them by the inductive layer 5 of lower conductivity, the heat absorbed at the cut-outs 11, 12 is transferred to the periphery and the centre of the bottom 2 in about the same amount of time. As a result, in the cooking utensil shown in FIGS. 1 and 2, the bottom 2 of the container can be heated substantially evenly on a thermal heat source.

In the three embodiments described above (cf. FIGS. 2, 4 and 6), the protective layer 7 preferably comprises a peripheral portion 14 which forms substantially half of the periphery 10 of the base 3. By this peripheral portion 14, the connection between the protective layer 7 and the lower conductive layer 6 can be improved. By leaving part of the peripheral wall 10 open, providing the bottom side 9 of the base 3 with a concavity for allowing thermal expansion can be avoided, as the base 3 is allowed to expand sideways. As a result, the bottom side 9 can be substantially flat, so that the contact with for example a ceramic hob is improved and the time lapse at the start can be reduced before the container 2 bottom is heated sufficiently for the preparation of food.

The invention claimed is:

1. Cooking utensil suitable for heating on both thermal and induction heat sources, comprising a container having a container bottom to which a base is connected, the base comprising a peripheral wall and a bottom side and having a layered structure, the bottom side of the base being located opposite the container bottom and being provided to contact the heat source, wherein the container bottom comprises a peripheral region at the peripheral wall and a central region inwardly from the peripheral region, wherein the layered structure of the base comprises an upper conductive layer connected to the container bottom, an inductive layer connected to the upper conductive layer, a lower conductive layer connected to the inductive layer and a protective layer connected to the lower conductive layer, wherein the upper and lower conductive layers contact each other only at the peripheral wall and are separated from each other by the inductive layer inwardly from the peripheral wall, the upper and lower conductive layers having a higher thermal conductivity than the inductive layer, wherein the bottom side of the base comprises an outer region delimited by the peripheral wall and an inner region inwardly from the outer region, the outer region being formed by at least part of the protective layer and the inner region being at least partly constructed of a material of higher thermal conductivity than the material of the protective layer such that an average thermal conductivity of the layered structure between the inner region of the bottom side of the base and the peripheral region of the container bottom is higher than an average thermal conductivity of the layered structure between the inner region of the bottom side of the base and the central region of the container bottom.

2. Cooking utensil according to claim 1, wherein the thermal conductivity of the layered structure at level of the inductive layer is higher at the peripheral wall than inwardly from the peripheral wall.

3. Cooking utensil according to claim 1, wherein the protective layer forms part of the inner region of the bottom side of the base, and including one or more cut-outs in the protective layer in the inner region.

4. Cooking utensil according to claim 3, wherein a first of the one or more cut-outs in the protective layer is located centrally on the bottom side of the base, the first cut-out having a diameter of about one third of a diameter of the base.

5. Cooking utensil according to claim 4, wherein a second of the one or more cut-outs in the protective layer has the form of an illustration.

6. Cooking utensil according to claim 5, wherein a third of one or more cut-outs in the protective layer is ring-shaped.

7. Cooking utensil according to claim 3, including an applied layer of a material having a thermal conductivity which is equal to or above the thermal conductivity of the lower conductive layer in at least one of the one or more cut-cuts.

8. Cooking utensil according to claim 7, wherein the applied layer is made of copper or a copper alloy.

9. Cooking utensil according to claim 1, wherein the protective layer comprises a peripheral portion which forms substantially half of the peripheral wall of the base.

* * * * *